United States Patent [19]

Meye et al.

[11]  4,170,404
[45]  Oct. 9, 1979

[54] MOUNTING STRUCTURE FOR OPTICAL ASSEMBLIES IN NONMECHANICAL PRINTERS

[75] Inventors: Wolfgang Meye, Neuried; Ludwig Schmidt, Munich, both of Fed. Rep. of Germany

[73] Assignee: Siemens Aktiengesellschaft, Berlin & Munich, Fed. Rep. of Germany

[21] Appl. No.: 851,941

[22] Filed: Nov. 16, 1977

[30] Foreign Application Priority Data

May 9, 1977 [DE] Fed. Rep. of Germany ....... 2720790

[51] Int. Cl.² ............................................. G02B 7/00
[52] U.S. Cl. ...................................... 350/252; 248/1; 248/178; 350/255; 350/321
[58] Field of Search ............... 350/252, 245, 247, 255, 350/321; 248/1, 178; 356/256; 355/8, 3 R, 55–59

[56] References Cited

U.S. PATENT DOCUMENTS

| 565,346 | 8/1896 | Goodyear, Jr. | 356/256 X |
|---|---|---|---|
| 3,612,679 | 10/1971 | Punnett et al. | 355/8 |
| 3,747,890 | 7/1973 | Tubbs | 356/256 X |
| 3,800,303 | 3/1974 | Picquendar et al. | 355/3 |
| 3,861,863 | 1/1975 | Kudsi | 432/60 |
| 4,030,823 | 6/1977 | Brugger et al. | 355/8 |

FOREIGN PATENT DOCUMENTS

655856 8/1951 United Kingdom ..................... 350/321

Primary Examiner—F. L. Evans
Attorney, Agent, or Firm—Hill, Van Santen, Steadman, Chiara & Simpson

[57] ABSTRACT

A mounting device for mounting optical components within a nonmechanical printer including a pair of parallel guide rails having end portions received in attachment plates which are easily attachable to the printer frame. Mounting members are attachable to the guide rails pivotable about one of the guide rails and movable axially the guide rails. Optical component assemblies are attachable to the mounting members and movable transversely thereof.

16 Claims, 8 Drawing Figures

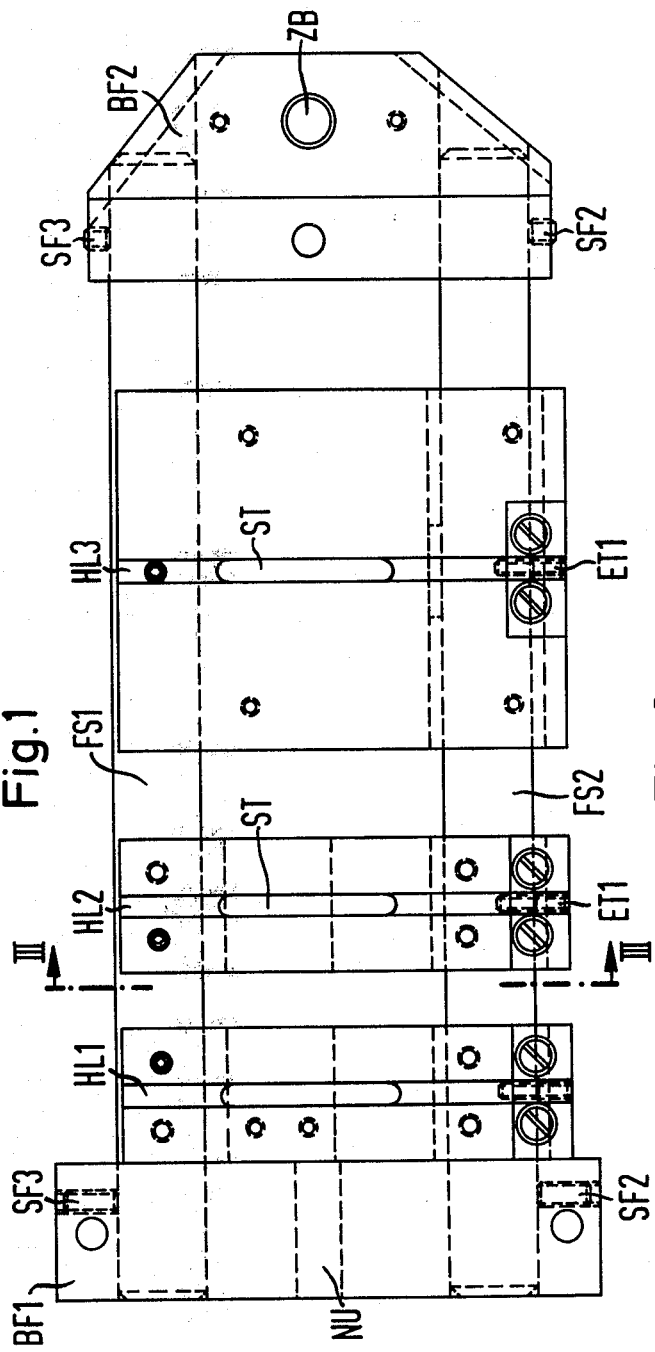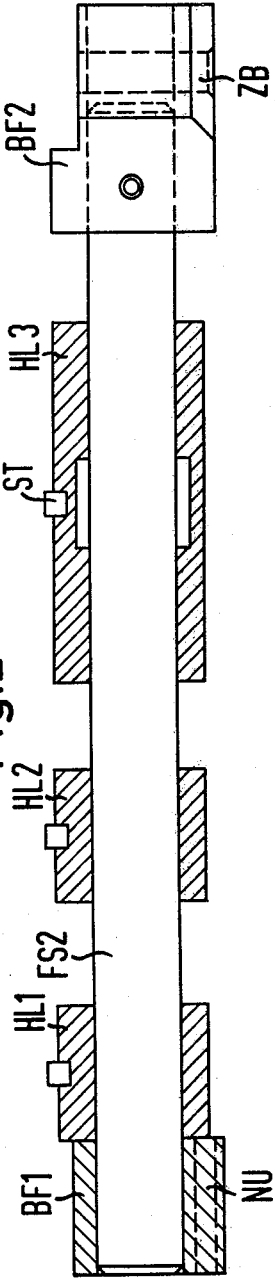

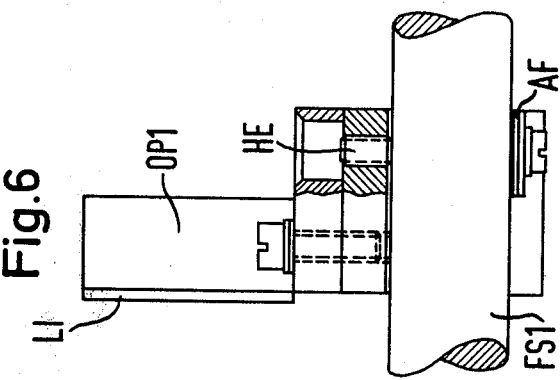
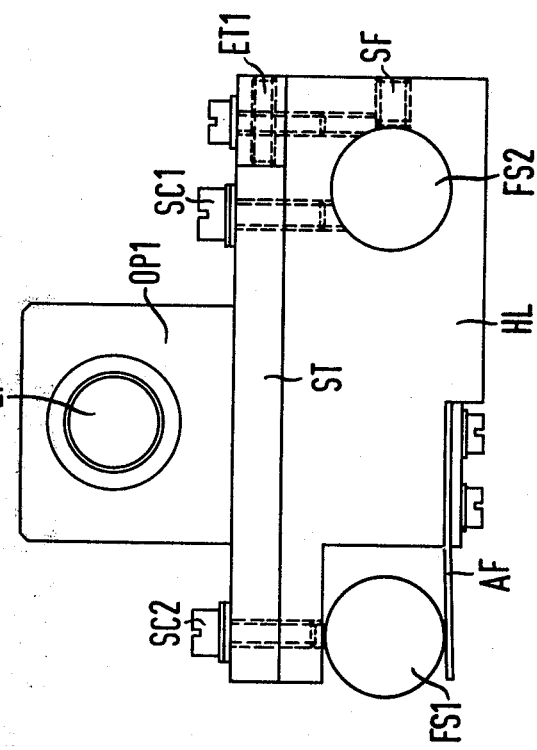

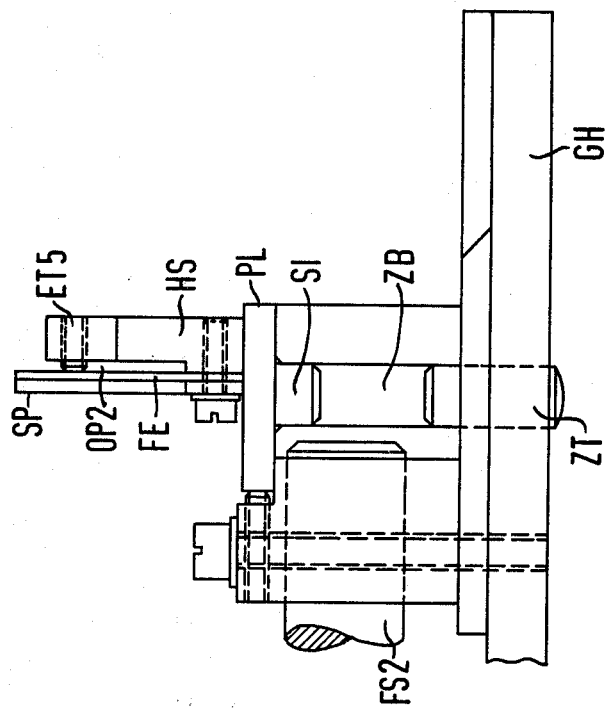
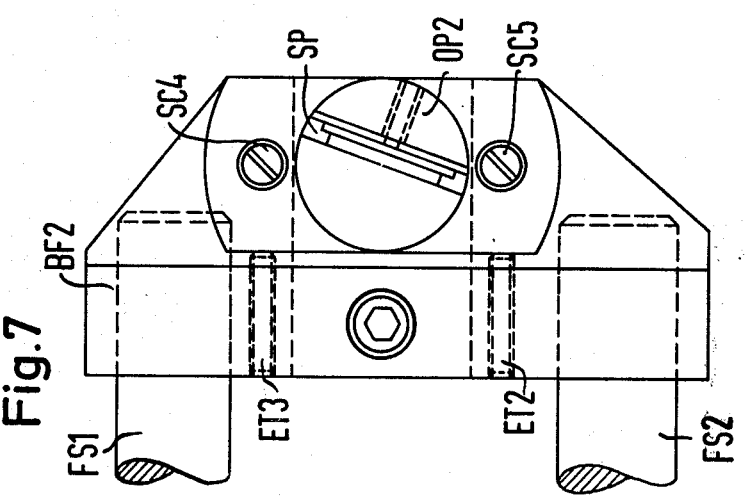

MOUNTING STRUCTURE FOR OPTICAL ASSEMBLIES IN NONMECHANICAL PRINTERS

BACKGROUND OF THE INVENTION

1. Field of the Invention

This invention relates to nonmechanical printers and copiers and more particularly to an optical component support for such printers.

2. Prior Art

Nonmechanical printers and copiers in which latent charged images of the characters or symbols to be printed are generated on photoelectric data carriers by a light beam which is produced by a light source and directed through optical components to shape it and process it and which is played directly, or via a rotating mirror, on the data carrier, are known to the art.

Nonmechanical printers which operate on the photoelectric principle are well known. See for example U.S. Pat. No. 3,861,863. In one type of nonmechanical printer or copier (hereinafter generally referred to as an electrostatic copier), a light source such as a laser, is utilized to generate a light beam. The light beam is directed via mirrors and lenses to an acousto-optical beam deflector. The acousto-optical beam deflector splits the light beam into a series of subsidiary beams which are disposed virtually one above the other and which are thereafter directed through additional lenses to a rotating mirror. The subsidiary beams are redirected from the rotating mirror to the data carrier which may be equipped with a photoelectric layer. The data carrier can, for example, be a photoconductive drum.

In such electrostatic copiers it is necessary to arrange a series of optical components between the light source and the rotating mirror. These optical components shape and focus the light beam. In order to achieve the desired precise shaping and focusing of the light beam, the individual optical components must be highly accurately located within the path of the light beam. Such optical components are also necessarily positioned between the rotating mirror and the data carrier. Once again precise positioning of the optical components is necessary.

It would be an advantage to provide a support assembly for such optical components which facilitates precise positioning of the components.

SUMMARY OF THE INVENTION

It is therefore the principal object of this invention to provide for positioning of the optical components in an electrostatic copier between a light source and a rotating mirror or between the mirror and the data carrier such that adjustment can be performed simply. It is a further object to provide that the adjustment of the optical components can be accomplished exterior of the copier.

These objects are achieved by providing a support arrangement in which all the optical components located between the rotating mirror and the light source or the data carrier are combined into an optical unit arranged for displacement on guide rails. The guide rails are attached at their ends to attachment plates. The attachment plates are each equipped either with a centering pin or a centering hole which can be mated with a respective centering hole or centering pin provided within the copier. In this manner precise positioning of the optical unit in the path of the light beam is automatically provided.

Because all the optical components are combined into a single optical unit, they can be adjusted exterior of the copier in an adjusting jig. All that is then necessary is to insert the optical unit as a whole into a precise given position within the copier. To this end, centering pins or locating dowels are provided in respectively the optical unit and the copier. Further adjustment of the individual optical components after insertion of the unit into the printer is therefore not necessary. Furthermore the optical unit can be exchanged without any difficulty and replaced by another unit.

In order to simplify the assembly of the unit, it is convenient to position each of the optical components in optical component assemblies which are mounted on mounting members which, for most of the component assembly, are identical in design. The guide rails can then be designed as rods. The mounting members are preferably designed such that they are rotatable around one of the guide rails. The degree of rotation can be determined by using a vertical adjustment screw, such as a set screw, which can be screwed through the mounting member into contact with one of the guide rails. For one of the guide rails the mounting member can be provided with a rail receiving bore on one side. On another side of the mounting member adjacent the other quide rail, the mounting member can be formed with a cutout into which the second guide rail is received. A spring can be used to load the mounting member cutout against the guide rail and, in fact, against the vertical adjusting screw.

Preferably the mounting member and the optical component assemblies can be co-designed such as to allow displaceability of the optical component assemblies transversely of the guide rails. To this end the mounting member can be equipped with a projecting tongue member while the optical component assembly has a mating groove. The tongue extends transversely of the guide rails. Preferably the groove is longer than the tongue. Once an optical component assembly has been positioned on a mounting with the tongue engaging in the groove, the optical component can then be transversely positioned. This can be accomplished through the use of an adjustment set screw on the mounting member which correctly fixes the position of the optical component assembly. After the optical component assembly has been fixed in relation to the mounting member through the intermediary of the adjusting screw, the assembly can then be screwed down onto the mounting member to permanently set the position.

In those instances where the optical component of the optical component assembly should be rotated relative to the axis of the guide rails, such as for example a mirror, the optical component assembly can be provided with a pin insertable into a hole in the mounting member. Thus the component can then be rotated relative to the mounting member.

The optical component assemblies themselves can be so constructed that the optical element can have its position changed relative to other elements. For example a mirror used as one of the optical elements can be so designed that it is received in a bracket including a flat strip spring under load. The mirror is attached to a free end of the spring. In the bracket, behind the spring, an adjuster screw is provided against which the spring bears with a preload. By adjusting the screw the inclination of the mirror can be adjusted.

One of the advantages of the support according to this invention is the fact that adjustment of the optical components can be performed extremely straightforwardly, simply and accurately. Where a laser is used as the light source, requirements for protection of the laser can readily be met because adjustment of the optical components can be performed separately from the copier at a special jig arrangement. A unit once adjusted can be inserted into the copier through the medium of the aforementioned pins and holes. When the laser in the copier has already been adjusted, a change of the optical unit can be effected directly without making any change in the optical quality of the transmitted laser beam.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure and in which:

BRIEF DESCRIPTION OF THE DRAWINGS

FIG. 1 is a top plan view of a support assembly according to this invention showing mounting members, guide rails and attachment plates.

FIG. 2 is a partial section through one side of the mounting of FIG. 1.

FIG. 5 is an end plan view of one of the mounting members and associated optical component assembly.

FIG. 6 is a side view, partially in section, of the device of FIG. 5.

FIG. 7 is a top plan view of another optical component assembly and associated mounting member in position on an attachment plate.

FIG. 8 is a side elevation of the embodiment of FIG. 7.

DESCRIPTION OF THE PREFERRED EMBODIMENTS

Figure 4:
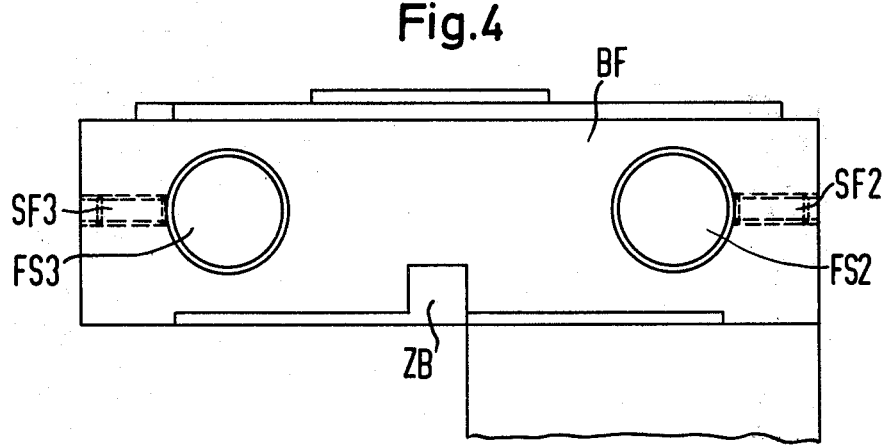
FIG. 4 is an end plan view of one of the attachment plates.

The optical support assembly of this invention shown in FIG. 1 includes spaced apart parallel axis guide rails FS1 and FS2 on which mounting members HL1, HL2 and HL3 of different widths are positioned. The guide rails FS1 and FS2 are attached, at their respective ends, to attachment plates BF1 and BF2 which can also function as mounting members. The guide rails FS1 and FS2 are attached to the attachment plates BF1 and BF2, as illustrated particularly clearly in FIG. 2, and are received in bores therein. The attachment plates BF1 and BF2 are each provided with pin receiving holes ZB or with pins. In the examples of FIGS. 1, 2 and 4 holes ZB are used. These cooperate with corresponding members on a frame member of the electrostatic copier to locate the attachment plates as is more clearly shown in FIG. 8.

Between the attachment plates BF1 and BF2 mountings HL are arranged in such a manner that they can be moved with respect to the guide rails. Thus the position of the mounting members HL can be adjusted according to the way the light beam is to be influenced by the particular optical element which is carried by the particular mounting. The mountings HL preferably correspond in width to the optical component assembly which is to be attached thereto. For example mountings HL1 and HL2 can be designed to accommodate lenses while HL3 can be designed to accommodate an acousto-optical transducer.

Figure 3:
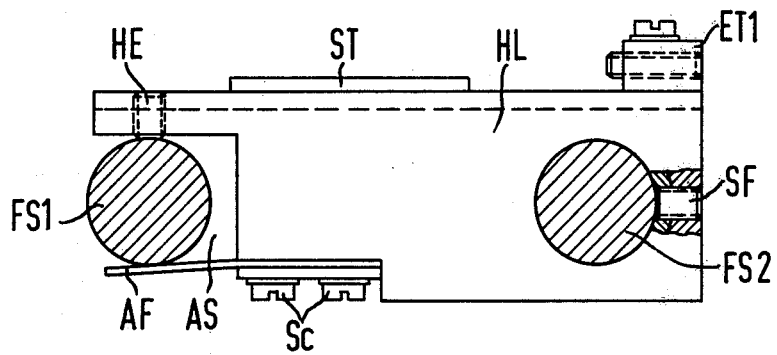
FIG. 3 is a section taken along the lines III—III of FIG. 1.

The mountings HL1 to HL3 are substantially identical in design except for their widths. The layout of the mounting members is best shown in FIG. 3. Each mounting member includes a bore adjacent one side through which a guide rail FS2 passes. The other side of the mounting member is provided with a cutout portion AS intended to receive the other guide rail FS1 with a top ledge portion overlying the guide rail FS1. In order to securely locate the guide rail FS1 in the cutout AS, a spring AF is provided which biases the guide rail against the ledge of the cutout AS and into contact with a vertical adjuster or set screw HE. The spring AF may be attached to the mounting HL by fastening means such as screws SC.

The mounting HL is thus designed in such a way that it can be rotated about the guide rail FS2. The set screw HE can be used to control the amount of pivoting of the mounting member HL around the guide rail FS2. Contact between the guide rail FS1 and the set screw HE is preferably insured by providing a spring AF which is in a preloaded condition. Once the mounting member HL is in position on the guide rails, that is, once its position along the length of the guide rails has been determined, that position can be set by means of set screw SF which can be screwed inwardly and outwardly in the side of the mounting member HL into contact with the guide rails FS2.

In order to properly mount an optical component assembly, the mounting member HL is provided with a projecting tongue ST which is centrally located with respect to the mounting member HL and may be received in a groove running across the mounting member. The optical component assemblies are correspondingly equipped with a groove dimensioned to receive the tongue ST. Preferably the optical component assembly's groove is longer than the tongue ST.

To adjust the position of the optical component assembly vis-a-vis the mounting member HL, and adjusting screw ET1 can be provided which can be screwed inwardly and outwardly towards and away from the tongue and which is positioned to abut a side of the optical component assembly. By changing the length of projection of screw ET, an optical component will be secured in position on the tongue ST in one direction.

As best illustrated in FIG. 4, which shows a side elevation of one of the attachment plates BF, guide rails FS1 and FS2 are secured in the attachment plates. This can be accomplished through the use of further set screws FS2 and FS3. The attachment plates BF furthermore are equipped with the pin hole ZB previously referred to. Obviously, instead of holes ZB projecting pins can be provided on the plate BF with a corresponding hole ZB provided in the housing or on the frame of the electrostatic copier. The indexable pins and holes are designed such that the attachment plates will accurately be fixed on the frame or within the housing of the electrostatic copier such that the overall optical unit which consists of the guide rails, attachment plates and mounting members will be precisely positioned within the copier.

The pin holes ZB may be drillings. However, it is also possible, as shown by a comparison of FIGS. 2 and 4 to provide a pin hole in one attachment plate and a groove in the other attachment plate. FIGS. 1 and 2 illustrate the pin hole ZB in the attachment plate BF2 while NU in those figures is to indicate a groove in the attachment plate BF2.

The mounting members HL can be designed differently from that shown in FIG. 3. For example the mounting member HL can be provided with a bore into which a pin attached to one of the optical component assemblies can be inserted. In this manner the optical component assembly can be rotated relative to the mounting member. It is also possible to design the attachment plates BF as a mounting for an optical component assembly. This is the case, for example in FIGS. 1 and 2, with the attachment plate BF2 which has been designed as a mounting member also. The plate BF2 is designed to show the modification of the mounting member wherein a bore is provided which extends through the attachment plate and which can receive a pin attached to the optical component assembly. If desired the bore for receipt of the pin of the optical component assembly can simultaneously function as the pin hole ZB of the attachment plate BF as is illustrated in FIG. 8.

The attachment of an optical component assembly OP1 which is equipped with an optical element, for example, a lens, to a mounting member HL is shown in FIGS. 5 and 6. The lens is identified as L1. The optical component assembly OP1 is placed on the mounting member HL in such a manner that the tongue ST of the mounting member HL will engage in a groove in the optical component assembly. In this context, the groove in the optical component assembly OP1 can extend over the full transverse length thereof. The position of the optical component assembly OP1 in relation to the mounting member HL is thereafter adjusted by means of screw ET1. The optical component assembly OP1 has a side wall which abuts against the screw ET1. Once the screw ET1 has been accurately adjusted, the position of the optical component assembly OP1 will be precisely defined in relation to the mounting member HL. The optical component assembly OP1 can then be screwed down to the mounting member by means such as bolts SC1 and SC2. In order to provide for movement of the optical component assembly with respect to the mounting member during adjustment of the screw ET1, the bores through the mounting which receive the bolts SC1 and SC2 can have a diameter larger than the threaded portion of the bolts but less than the bolt heads. Of course an interposed washer can be used also. Positioning of the mounting assembly HL together with its associated optical component assembly OP1 on the guide rails FS1 and FS2 as well as the fixing of those positions, are performed in the above indicated member. The positional fixing is performed with aid of adjusting screws FS while the rotational position of the mounting member HL on the guide rail FS is determined by means of vertical set screw HE.

Thus each individual optical component assembly OP1 can be adjusted in three different directions. It can be adjusted in the axial direction of the guide rails FS1 and FS2, and transversely of those guide rails. Further the optical component assemblies can be rotated about one of the guide rails. When the pin design is used it can further be rotated with respect to the mounting member.

The positioning of other optical components such as, for example an acousto-optical transducer, on a mounting HL can be effected in a corresponding manner. Thus no particular description of such an example will be herein made.

FIGS. 7 and 8 illustrate the construction of an optical component assembly OP2 and its attachment to a mounting member in such a situation where the component OP2 must be rotatable on the mounting member. Instead of one of the mounting members HL, an attachment plate BFT is illustrated as being the mounting member. The optical component OP2 may, in this example, include as an optical element the mirror SP. The attachment plate BF2 is provided with a bore ZB. The optical component assembly is provided with a mating pin S1 which can be inserted into the bore ZB. The optical component assembly can further be provided with a bottom plate PL which carries the pin S1. The position of the plate PL can be adjusted by means of the set screws ET2 and ET3 which are coaxial with the guide rails FS1 and FS2. When the position of the plate PL, and therefore of the optical component assembly OP2 has been adjusted by means of the screws ET2 and ET3 the plate PL can be screwed down onto the attachment plate by means of bolts SC4 and SC5 which may correspond to bolts SC1 and SC2 in their operation. Thus, with an attachment plate BF2 and an optical component assembly OP2, as illustrated in FIGS. 7 and 8, it is possible to rotate the optical component assembly OP2 relative to the attachment plate BF2.

FIG. 8 also illustrates attachment of the optical unit to the frame or housing of the electrostatic copier. The frame or housing GH can be provided with a projecting pin ZT which is received in the hole ZB. Such co-mating pins and holes, or grooves and tongues, are provided for each of the attachment plates BF1 and BF2.

From FIGS. 7 and 8 it will also be apparent that the particular component assembly OP2 can be designed such that the optical element, i.e. the mirror SP can be attached to the optical component assembly so as to be adjustable thereon. As an example, a vertically extending bracket member HS can be attached to the plate PL. A spring FE is attached to the bracket HE under a preload in the direction of a set screw ET5. A free end of the spring FE is attached to the mirror SP. The set screw ET5 can then be screwed with respect to the bracket HE towards and away from the spring FE thereby allowing the mirror SP to be adjusted in respect to the optical component assembly OP2.

Of course it is to be understood that the optical component assembly OP can be designed such that other changes in position of the optical element with respect to the optical component assembly can be made. For example the optical component assembly can be so designed that the optical element can be rotated thereon or have its position changed in a direction perpendicular to the mounting member.

It will therefore be seen from the above that our invention contemplates an optical unit for electrostatic copiers and nonmechanical printers which includes a pair of spaced apart axis parallel guide rails having axial ends received in attachment plates. The attachment plates are provided with configurations which precisely index with corresponding configurations on the electrostatic copier frame or housing such that the optical unit will be properly positioned within the frame or housing by the index of the attachment plates with the corresponding configuration of the housing or frame. Mounting members are attached to and carried by the two guide rails. The mounting members are movable axially of the guide rails as may be one or both of the attachment plates. The mounting members are equipped with vertical adjusting means with respect to one of the guide rails and with a pivotable connection to the other guide rail such that the mounting members can be rotated with respect to the guide rails. Each of the mounting members is in turn provided with a tongue and groove connection to an optical component assembly which allows the optical component assembly to be moved transversely of the mounting member. Further, permanent fastening means are provided to attach the optical component assembly to the mounting member once its position vis-a-vis the mounting member is adjusted. Finally the optical component assembly may be rotatably secured to the mounting member in such a way that the optical element carried by the optical component assembly can be rotated with respect to the axis of the guide rails. Additionally the optical element may be attached to the optical component assembly in such a way as to be adjustable vertically of the unit or at an angle to the horizontal defined by the guide rails. By means of a construction such as herein described, each of the optical elements of an optical unit can be precisely positioned with respect to the unit exterior of the copier. This allows therefore the use of a precise jig to determine precise positioning. Once the positioning has been set, the entire unit can then be quickly and easily inserted into the housing of the electrostatic copier.

Although the teachings of our invention have herein been discussed with reference to specific theories and embodiments, it is to be understood that these are by way of illustration only and that others may wish to utilize our invention in different designs or applications.

We claim as our invention:

1. An optical element support assembly for electrostatic copiers for attaching optical elements to the frame of the copier with the elements in proper alignment to act upon a light beam, comprising: an optical unit including a pair of parallel guide rails having opposite end portions adjustably and fixedly attached to attachment plates, means for mounting a plurality of optical elements to the rails and cooperating mating projections and openings on the attachment plates and frame associated portions of the copier whereby the unit can be quickly and properly positioned in the copier, at least one of the guide rails being circular in cross-section, the means for mounting including mounting members, at least some of the optical elements mounted on the mounting members, the mounting members being attached to the rails and rotatable about the said one rail, the mounting members being movable axially of the rails, the mounting members having abutment portion spaced from the one rail, the abutment portion contacting a second of the rails, spring means biasing the abutment portion into contact with the second rail.

2. The device of claim 1 wherein each mounting member is equipped with a set screw adjustable into opposition with a second of the rails whereby the degree of rotation of the mounting member about the one of the said rails is controlled by the said set screw, the set screw being the abutment portion.

3. The device of claim 2 wherein at least some of the mounting members are provided with circular bores receiving the one rail and with a cutout ledge portion receiving the second rail with a portion of the mounting member overlying the second rail, the set screw being received through the said portion, a spring attached to the said mounting member, the spring underlying the second rail and having a preload urging the second rail into abutment with the set screw.

4. A device according to claim 3 wherein the optical elements are carried by optical component assemblies, the optical component assemblies are attached to the mounting members, at least some of the optical component assemblies being movable transversely of the mounting members while being fixedly positioned on the mounting members longitudinally of the rails and fastening means for fastening the optical component assembly in adjusted position on the mounting member.

5. The device according to claim 4 wherein at least one of the mounting members and optical component assemblies are provided with opposed mating tongue and groove extending transverse the mounting member whereby the optical member can be moved transverse of the mounting member while the engagement of the tongue and groove positions the optical component assembly longitudinally of the rails, and set screw means carried by the mounting member are provided engaging a side face of the optical component assembly to precisely position the optical component assembly transverse of the mounting member.

6. The device of claim 5 wherein bolt means are provided for fastening the optical component assembly to the mounting member upon attainment of proper positioning of the optical component assembly on the mounting member.

7. The device according to claim 4 wherein at least one of the optical component assemblies is rotatable on its associated mounting member.

8. A device according to claim 4 wherein an optical element is carried by at least one of the optical component assemblies in a manner allowing tilting of the optical element with respect to the optical component assembly.

9. A device according to claim 8 wherein the optical component assembly includes a mounting bracket having an adjustable set screw projecting therefrom, a projecting spring member having a first end carried by the bracket and a free end opposed to and biased towards the bracket set screw, the optical element attached to the free end of the spring, and the optical element being tiltable with respect to the mounting member by adjustment of the brakcet set scew.

10. A device according to claim 7 including a pair of set secrews carried by the mounting member spaced from one another transversely of the mounting member, the set screws being engageable with a base portion of the one of the optical component assemblies to control rotation thereof.

11. A device according to claim 10 wherein bolts means are provided for securing a properly positioned optical component assembly to the mounting member.

12. A device according to claim 1 wherein additional optical elements are attachable to and positionable on at least one of the attachment plates.

13. A device according to claim 1 wherein the optical elements are carried by optical component assemblies, the optical component assemblies are attached to the mounting members, at least some of the optical component assemblies being movable transversely of the mounting members while being fixedly positioned on the mounting members longitudinally of the rails and fastening means for fastening the optical component assembly in adjusted position on the mounting member.

14. The device according to claim 13 wherein at least one of the mounting members and optical component assemblies are provided with opposed mating tongue and groove extending transverse the mounting member whereby the optical member can be moved transverse of the mounting member while the engagement of the tongue and groove positions the optical component assembly longitudinally of the rails, and set screw means carried by the mounting member are provided engaging a side face of the optical component assembly to precisely position the optical component assembly transverse of the mounting member.

15. The device of claim 14 wherein bolt means are provided for fastening the optical component assembly to the mounting member upon attainment of proper positioning of the optical component assembly on the mounting member.

16. An optical element support assembly for electrostatic copiers for attaching optical elements to the frame of the copier with the elements in proper alignment to act upon a light beam comprising: an optical unit, the optical unit including a pair of parallel spaced apart guide rails having opposite end portions adjustably and fixedly attached to attachment plates, the guide rails longitudinally adjustably carrying a plurality of mounting members, at least some of said mounting members being rotatable about one of the rails, an optical component assembly carried by each of said mounting members, means restraining movement of the optical component assembly on the mounting member longitudinally of the rails while allowing movement of the optical component assembly transverse the rails on the mounting member, means for fixedly positioning the optical component assembly to the mounting member, and optical elements carried by the optical component assemblies whereby the position of the optical elements on the unit is longitudinally adjustable of the rails by longitudinal adjustment of the mounting member on the rails, is rotatably positionable with respect to the rails by rotatable adjustment of the mounting member about the one rail, and is transversely adjustable by transverse movement of the optical component assembly on the mounting member, and adjustable means selectively fixing the mounting member longitudinally of the rails, a second adjustable fixing means selectively fixing the degree of rotation of the mounting member about the one rail by engagement with a second rail, and cooperating mating projections and openings on the attachment plates and frame associated portions of the copier whereby the unit can be quickly and properly positioned in the copier.

* * * * *